(12) United States Patent
Van Raalten et al.

(10) Patent No.: US 8,669,021 B2
(45) Date of Patent: Mar. 11, 2014

(54) ELECTRODE COMPARTMENT FOR AN ELECTROCHEMICAL CELL, A REFRESHING SYSTEM FOR IT AND AN EMULSION TO BE USED THEREFORE

(75) Inventors: Rutger Alexander David Van Raalten, Delft (NL); Krishna Narayan Kumar Kowlgi, Delft (NL); Gerardus Joseph Maria Koper, Delft (NL)

(73) Assignee: Delft Enterprises B.V., Delft (NL)

( * ) Notice: Subject to any disclaimer, the term of this patent is extended or adjusted under 35 U.S.C. 154(b) by 88 days.

(21) Appl. No.: 13/122,952

(22) PCT Filed: Oct. 6, 2009

(86) PCT No.: PCT/NL2009/050596
§ 371 (c)(1),
(2), (4) Date: Jun. 27, 2011

(87) PCT Pub. No.: WO2010/041937
PCT Pub. Date: Apr. 15, 2010

(65) Prior Publication Data
US 2011/0250515 A1    Oct. 13, 2011

(30) Foreign Application Priority Data
Oct. 7, 2008    (NL) .................................... 2002071

(51) Int. Cl.
*H01M 4/02*    (2006.01)
*H01M 4/36*    (2006.01)
*C25B 9/00*    (2006.01)
*C25C 7/00*    (2006.01)

(52) U.S. Cl.
USPC ............................ 429/523; 429/516; 204/242

(58) Field of Classification Search
None
See application file for complete search history.

(56) References Cited

FOREIGN PATENT DOCUMENTS

FR    1477249 A    4/1967
WO    WO-03/063278 A2    7/2003

OTHER PUBLICATIONS

Definition of microemulsion, Terminology of polymers and polymerization processes in dispersed systems, Pure Applied Chemistry, 2011, vol. 83, No. 12, pp. 2229-2259.*

Matsuno, et al., "Improvement in Electrode Performance of Three-Phase Fluidized-Bed Electrodes for an Alkaline Fuel Cell Cathode", Int. J. Hydrogen Energy, Elsevier Science Publishers B.V. Barking, GB, vol. 22, No. 6, Jun. 1, 1997, pp. 615-620, XP004059124.

(Continued)

*Primary Examiner* — Cynthia K. Walls
(74) *Attorney, Agent, or Firm* — Gilberto M. Villacorta; Sunit Talapatra; Foley & Lardner LLP

(57) ABSTRACT

The invention relates to an electrode compartment for an electrochemical cell, including a bicontinuous micro-emulsion, wherein catalytic parts are generated in-situ in a fluid, which can act as a cathode as well as an anode. The electrode compartment comprises a connection to supply fuel or an oxidator, for example oxygen, to the compartment. The electrode compartment is part of a refreshing system with a reserve container for an emulsion and a storage container for used emulsion, conduits to connect each of the containers with the electrode compartment and a transport unit, for example a pump, to move the emulsion.

13 Claims, 2 Drawing Sheets

(56) References Cited

OTHER PUBLICATIONS

Kronberger, et al. "Reduction of oxygen from electrolyte emulsions with high oxygen contents", Journal of Power Sources, vol. 86, No. 1-2, Mar. 1, 2000, pp. 562-567, XP004194174, ISSN: 0378-7753.

Roth, et al., "Pt—Ru fuel cell catalysts subjected to $H_2$, CO, $N_2$ and air atmosphere: An X-ray absorption study", Applied Catalysis A: General, Elsevier Science, Amsterdam, NL, vol. 319, Feb. 21, 2007, pp. 81-90, XP005876349, ISSN: 0926-860X.

Boutonnet, et al., "Recent developments in the application of nanoparticles prepared from w/o microemulsions in heterogeneous catalysis", Current Opinion in Colloid & Interface Science, London, GB, vol. 13, No. 4, Aug. 1, 2008, pp. 270-286, XP022716741, ISSN: 1359-0294.

Sripriya, et al., "The effect of structure of oil phase, surfactant and co-surfactant on the physicochemical and electrochemical properties of bicontinuous microemulsion", Journal of Colloid & Interface Science, Academic Press, New York, NY, US, vol. 314, No. 2, Aug. 23, 2007, pp. 712-717, XP022211029, ISSN: 0021-9797.

Esquivel et al.: "A novel method to prepare magnetic nanoparticles: precipitation in bicontinuous microemulsions", Journal of Material Science, Kluwer Academic Publishers, 130, vol. 42, No. 21, Jul. 20, 2007, pp. 9015-9020, XP019528924, ISSN: 1573-4803.

* cited by examiner

ELECTRODE COMPARTMENT FOR AN ELECTROCHEMICAL CELL, A REFRESHING SYSTEM FOR IT AND AN EMULSION TO BE USED THEREFORE

The present invention relates to an electrode compartment for an electrochemical cell. Moreover, the invention relates to a refreshing system for an electrode compartment according to the invention. The invention also relates to an emulsion to use with an electrode compartment according to the invention. At the same time, the invention relates to an electrochemical cell that contains such an electrode compartment.

Electrochemical cells are widely known in technology. A fuel cell is an example of an electrochemical cell. Hereafter we will mainly refer to a fuel cell as an electrochemical cell. However, it should be understood that other electrochemical cells are also suited to apply in the present invention. Based on the given description hereafter, a specialist in this technology will easily be able to determine other application areas for the electrode compartment according to the invention.

Hereafter we will specifically refer to so-called low temperature fuel cells in which hydrogen and oxygen are used to provide an electrical power. More specifically, the polymer fuel cell can be applied here, a so-called "Proton Exchange Membrane Fuel Cell" (PEMFC), in which hydrogen is applied as an energy carrier. Such a fuel cell has an electrical efficiency between 45%-90%, depending on the quality of the cell and the circumstances.

A disadvantage of the known PEMFC is the cost to generate an electric power, weighted against performance (amount of generated power). The amount of platinum needed in the modern fuel cells is a cause for the bad price/performance ratio at this moment.

Thus, the present invention intends to provide an improved electrode compartment for an electrochemical cell.

More specifically, the invention intends to provide an alternative electrode compartment for the applied electrode compartments at this moment.

Moreover, the invention intends to provide an electrode compartment in which a catalyst has an improved efficiency or an improved attainability for the reactants.

On top of that, the invention intends to provide a refreshing system for an electrode compartment according to the invention. Moreover, the invention intends to provide an emulsion to use with the electrode compartment according to the invention.

An electrochemical cell is also part of the invention, whereby this cell contains an electrode compartment according to the above described invention.

At least one of the aforementioned goals is provided by means of an electrode compartment for an electrochemical cell, containing an emulsion with catalyst parts in a fluid. Because the catalyst parts are contained in the fluid, the attainability of the catalyst parts is greatly improved. The catalyst parts are generated in-situ in the bicontinuous micro-emulsion. This happens by first adding a metal complex (oxidant and also reducible to catalyst) to the water phase of the first bicontinuous micro-emulsion. Next, a reductor is dissolved in the water phase of a second bicontinuous micro-emulsion. Both emulsions are mixed to create a bicontinuous micro-emulsion wherein the catalyst parts are formed, because the metal complex is reduced when it comes in contact with the reductor.

The electrode compartment according to the invention can be made as a cathode compartment and as a anode compartment. Hereby an oxidator can be supplied to the cathode compartment and a fuel can be supplied to the anode compartment. To this end the compartments will be equipped with a supply system to add oxygen respectively fuel.

In this invention the catalyst parts are absorbed in a fluid. This offers the advantage that after a certain operational time, when part of the catalyst parts or other substances become inactive, the fluid can simply be refreshed. For example, a refreshing system can be provided with a reserve container for an emulsion and a storage container for used emulsion, conduits to connect both containers with the electrode compartment and a transport unit to move the emulsion from the compartment to the storage container for used emulsion and to move the fresh emulsion from the reserve container for the fresh emulsion to the electrode compartment. A transport unit could be a pump, for example.

This will make it possible to move the at least partially used emulsion with a diminished activity, from the electrode compartment to the storage container for used emulsion. Next, or simultaneously, the fresh emulsion can be supplied to the electrode compartment from the reserve container for fresh emulsion.

It is even possible, within the scope of the invention, to manage an electrochemical cell in such a way that a continuous refreshing with emulsion in the electrode compartment takes place. In particular, this can be useful when the catalyst quickly becomes inactive.

According to the invention the electrochemical cell further comprises by preference supplying means to supply at least one of an oxidator, a reductor and a fluid to or from the electrode compartment.

For example, these means can be conduits, transport units and reserve containers.

The invention also provides a refreshing system for an electrode compartment according to the invention, including a reserve container for an emulsion and the other parts as described above.

The refreshing system according to the invention comprises by preference reserve containers and supplying means to supply at least one of an oxidator, a reductor, a catalyst and a fluid to the electrode compartment.

Finally the invention relates to an emulsion for an electrode compartment as described above, including a hydrophilic phase, a hydrophobic phase and a surface-active substance. The emulsion will also contain a catalyst in at least one of the hydrophilic phase and the hydrophobic phases.

The emulsion according to the invention can be applied in different forms. The emulsion concerns a bicontinuous micro-emulsion that is formed by combining the hydrophilic phase, hydrophobic phase and the surface-active substance. For example, a hydrophilic phase can be emulsified in the hydrophobic phase, or the hydrophobic phase can be emulsified in the hydrophilic phase. However, a bicontinuous structure can also be formed. Next, a salt or a metal complex of the catalyst material can then be supplied to the hydrophilic phase of one of the emulsions. A reducing material can be supplied to a corresponding emulsion. When these two emulsions are mixed, a precipitation reaction will take place on which the catalyst parts are formed. A first example of salts, metal complexes and reducing material that can be applied as a combination are the following:

Metal complex: $H_2PtCl_6$
Reductor: $N_2H_4$
When combined Platinum (Pt) catalyst parts are formed. The catalyst has no preference for $H_2$ or $O_2$. Pt is suited for both.
Metal complex: $RuCl_3$
Reductor: $NaBH_4$ When combined Ruthenium (Ru) catalyst parts are formed. The catalyst has no preference for $H_2$ or $O_2$.

The metal complexes are in fact precursors for the catalyst parts. Other precursors than the aforementioned and that can be applied similarly are, for example:

a. Platinum Precursors
   i. $H_2PtCl_6$ (Hexachloride platinum acid) or $H_2PtCl_6.xH_2O$ (Hexachloride platinum acid hydrate)
   ii. $K_2PtCl_4$ (potassium tetrachloride platinate(II)) or $K_2PtCl_4.xH_2O$ (potassium tetrachloride platinate(II) hydrate)
   iii. $Pt(NH_3)_4(NO_3)_2$ (tetra-amine platinum nitrate)
   iv. $Pt(C_5H_7O_2)_2$ (Platinum(II) acetylacetonate)
b. Ruthenium Precursors
   i. $Ru(NO)(NO_3)_3$ (Ruthenium(III) nitrosylnitrate)
   ii. $Ru(dip)_3Cl_2$ where dip=4,7-difenyl-1,10-fenanthroline (Ruthenium-tri-dip-chloride),
   iii. $RuCl_3$ (Ruthenium chloride)
c. Palladium Precursors
   i. $Pd(NO_3)_2$ (Palladium nitrate)
d. Nickel Precursors
   i. $NiCl_2$ (Nickel chloride) or $NiCl_2.xH_2O$ (Nickel chloride hydrate)
   ii. $Ni(NO_3)_2$ (Nickel nitrate) or $Ni(NO_3)_2$ (Nickel nitrate hydrate)
   iii. $Ni(CH_3COO)_3$ (Nickel acetate) or $Ni(CH_3COO)_3$ $xH_3O$ (Nickel acetate hydrate)
   iv. $Ni(AOT)_2$ where AOT=Bis(2-ethylhexyl)-sulfo-amber acid (Nickel salt of AOT)
e. Reducing Agents
   i. $H_4$ (hydrogen) gas
   ii. $NaBH_4$ (sodium boron hydride)
   iii. $NaHSO_3$ (sodium bisulphite)
   iv. $N_2H_4$ (Hydrazine) or $N_2H_4.xH_2O$ (Hydrazine hydrate)
   v. $C_2H_4(OH)_2$ (Ethylene glycol)
   vi. $CH_3OH$ (Methanol)
   vii. $C_2H_5OH$ (Ethanol)

The following oxidants are examples of substances that can be applied with the aforementioned precursors/catalysts. The preferences of these oxidants are as follows:

a. oxidants
   i. oxygen: has the strongest interaction with Platinum, next palladium, nickel and ruthenium
   ii. air: identical as above, but physisorption of nitrogen affects the oxygen adsorption which diminishes the efficiency.
   iii. chloride: highest affinity for nickel, then ruthenium, followed by palladium and platinum (not completely certain)
   iv. chloride dioxide: same as above for chloride (not completely certain)
b. Fuels
   i. hydrogen: best results with palladium, then nickel, platinum and ruthenium
   ii. alcohol (methanol, ethanol, . . . ): platinum is better, easily gets poisoned, palladium and nickel and finally ruthenium (not completely certain)
   iii. alkanes: $C_1$, $C_2$, $C_3$, $C_4$, $C_5$, $C_6$, $C_7$ and further, like methane ($C_1$) to heptane ($C_7$), etcetera
   iv. acids: carbonic acid ($H_2CO_3$), etcetera A major advantage of the present invention is that an electrochemical cell can easily be made, that the electrochemical cell is very flexible to apply, for example by changing the concentration or the nature of the catalyst, oxidator, reductor, etc. and that the electrode compartments contain a self-healing emulsion. The latter is due to the fact that concentration changes in the fluid of the electrode compartment are neutralized by natural mixing.

Fluid evaporation, if the fluid is a liquid, or gas evasion, if the fluid is a gas, can easily be balanced by supplying additional fluid. Such a supply can be carried out at the same time as refreshing the fluid.

It has been noted as an advantage of the present invention that the synthesized catalyst parts in the micro-emulsion according to the invention correspond with the applied electrode compartments in practice. It is remarkable that the amount of platinum, that for example is used as a catalyst, is a factor 1,000 lower in the present electrode compartments compared to the electrodes known by modern technology. Thus, using the present invention will greatly diminish the costs compared to the electrochemical cells known by modern technology. It is also an advantage that producing an electrochemical cell according to the invention is much simpler than with the prior art technology.

Above we already described how the emulsion, specifically a micro-emulsion and even more specifically a bicontinuous micro-emulsion, can be produced by combining and mixing two emulsions. Another possibility is absorbing a paste containing the corresponding catalysts into a watery or hydrophobic phase, a watery phase by preference. In this way, for example, the catalyst can be absorbed in the hydrophilic phase of the emulsion without a redox reaction.

In an experiment, described hereafter, an electrochemical cell, in this instance a fuel cell, is produced with an electrode compartment according to the present invention. The anode compartment consisted of the electrode compartment according to the invention, while the cathode compartment consisted of a cathode known in technology. A proton exchange membrane known in technology has been placed in between these two compartments.

Figure 1:
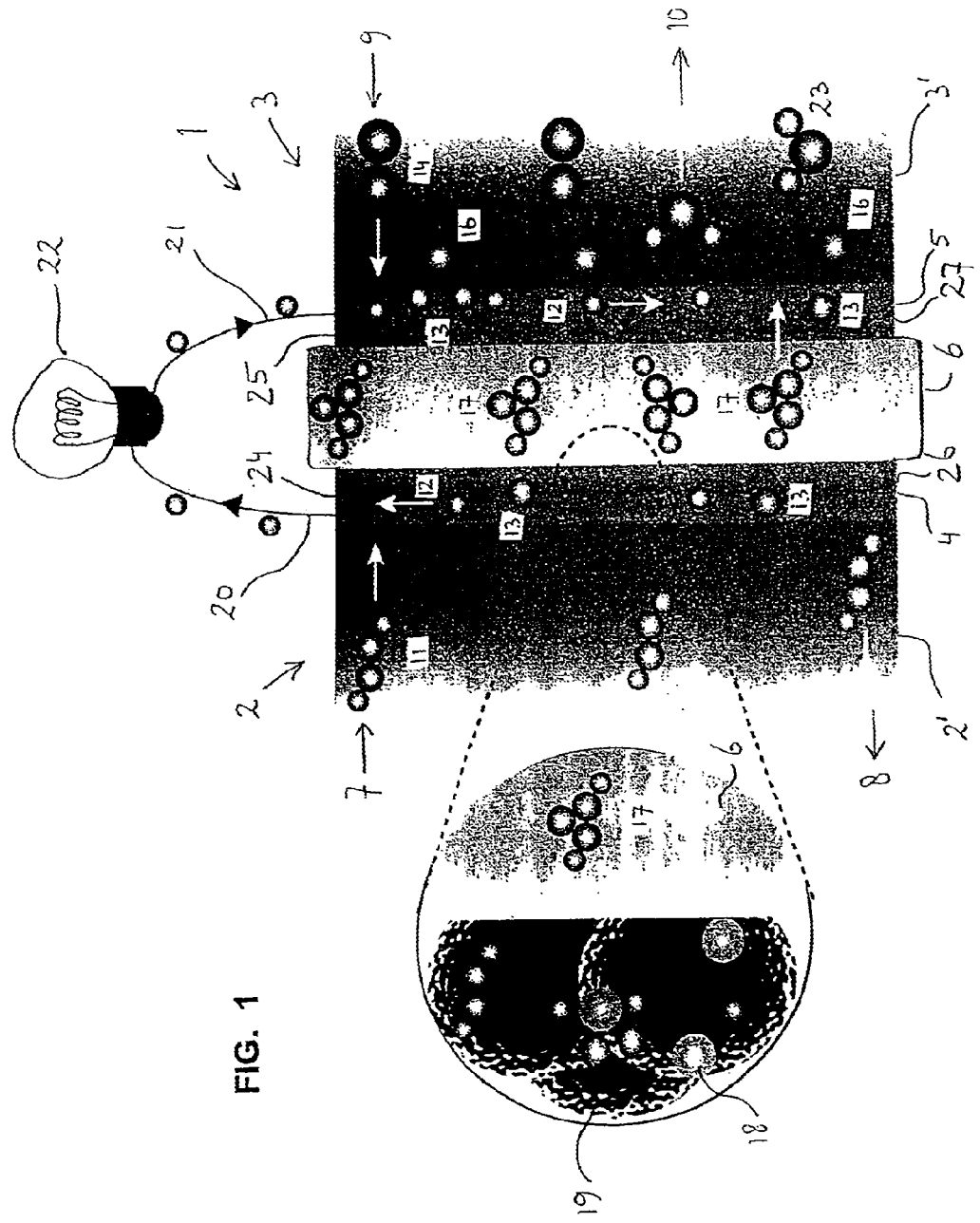
FIG. 1 shows a schematic view of the fuel cell.

FIG. 1 shows a schematic section of a fuel cell 1, with an anode side 2 with an anode 4 and a cathode side 3 with a cathode 5. A proton exchange membrane 6 is placed between both. Fuel, for example hydrogen 11, is directed through a supply system 7 with the gas diffusion layer 2' in the anode side. In the anode 4, a hydrogen molecule divides into a proton 13 and an electron 12 in delivering an electron. This division is stimulated by the catalyst 18. Possibly unused fuel will be removed from the anode side 2 by means of a drain 8. At the cathode side 3, an oxidator, for example oxygen 14, is directed through a supply system 9 to a gas diffusion layer 3'. Oxygen reacts with protons 13, that are directed by means of an $H_3O^+$ ion 17 through the proton exchange membrane to the cathode. In this process the oxygen 14 divides into $O^{2-}$ ions 16 that combine with the protons 13, in absorbing electrons 12 that are directed to the cathode by means of a conductor 20, 21 on the outside of cell 1, and a current consumer, for example a lamp 22. The herein formed water molecule 23 is removed by means of a drain 10. The heat created during the reaction is also removed from the cathode side 3. In both electrode compartments, conducting carbon 19 has been absorbed to facilitate the conduction of the electrons 12. Fresh catalyst fluid can be supplied to both electrode compartments 4, 5 through the conduits 24, 25. The (used) fluid, that already was inside of the electrode compartments, can be removed through the drains 26, 27.

Figure 2:
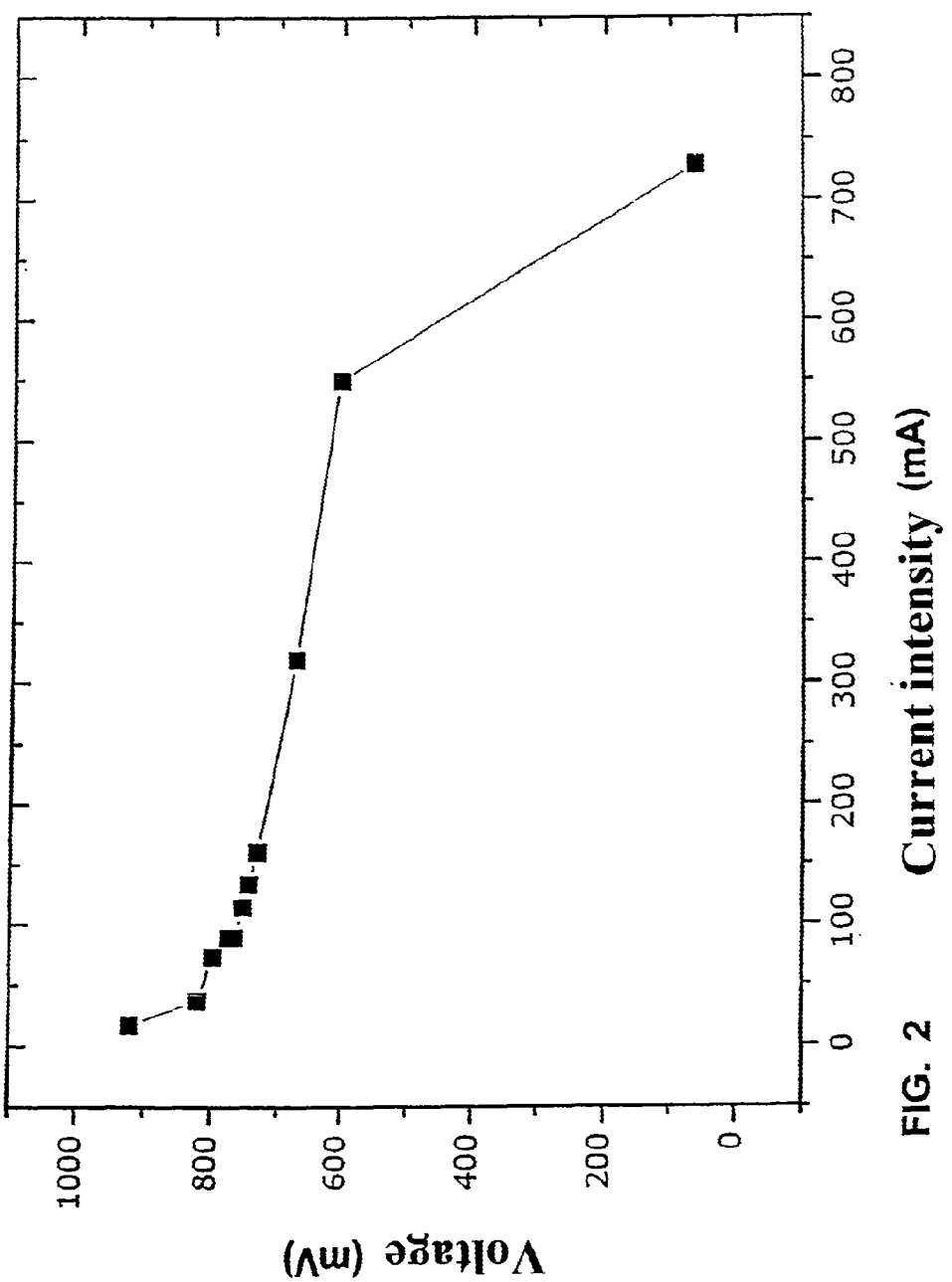
FIG. 2 shows a VI test result.

The results of the VI test shown in FIG. 2 show that the electrochemical cell gives a very stable image with a small linear reduction in the electrical current between 50 milliamperes and 550 milliamperes. The voltage at approx. 550 milliamperes is approximately 600 millivolts. At 50 milliamperes the voltage is approximately 800 millivolts.

A lifespan test indicated that the electrode compartment according to the invention remains very stable.

Example

Synthesis Micro-Emulsion

Material

Bis(2-ethylhexyl) sulfo-succinic acid sodium salt (AOT, 98%), n-heptane (>99.9%, chlorine platinum acid hydrate ($H_2PtCl_6 \cdot xH_2O$, >99.9%), $N_2H_4 \cdot xH_2O$, 100%), demineralised water.

Synthesis

Two bicontinuous micro-emulsions are prepared separately by mixing demineralised water, n-heptane and AOT. Bicontinuity is found at 20 weight.% water and a n-heptane-AOT weight rate of 2. At the water phase of one of the micro-emulsions, the metal complex ($H_2PtCl_6$) is added in advance. In the water phase of the other micro-emulsion, the reductor ($N_2H_4$) is dissolved. When both micro-emulsions have been produced they are mixed together.

In this way the platinum catalyst parts are formed in-situ in the bicontinuous micro-emulsion.

Experiment Fuel Cell

Material:

1. Nafione® membrane ALFA42177.VA of the company VWR International, Basisweg 34, 1043AP Amsterdam, Nederland.

2. Toray Carbon Paper, Teflonated, TGP-60 of the company Alfa Aesar GmbH & Co KG, Zeppelinstrasse 7, 76185 Karlsruhe, Duitsland.

3. Carbon Black Vulcan® XC 72R of the company Sepulchre SA/NV, Waterleliënlaan-Av. des Nénuphars 19/B.6-1160, Brussel, België.

4. Self assembled micro-emulsion and with grown in platinum nano parts of DelftChemTech, Technische Universiteit Delft, Julianalaan 136, 2628BL Delft, Nederland.

Equipment:

1. Proton Exchange Membrane Fuel Cell (PEMFC) of the company h-tec Wasserstoff-Energie-Systeme GmbH, Hydrogen Energy Systems, Lindenstrasse 48a, D-23558 Luebeck, Duitsland.

2. Electrolysers that produce hydrogen and oxygen from the various sources.

3. Voltmeter, ampere meter, several resistors and electric wiring from various sources.

4. Glass-ware (conic retorts, plates, pipettes or measuring cylinders) from various sources.

5. Doctor knife, spanner and L-key, spatula from various sources.

The bicontinuous micro-emulsion is entirely covered in an electrode compartment that is part of a fuel cell. In this experiment a cathode with a commercial design has been taken. The anode consists of the bicontinuous micro-emulsion. Next, at the anode side $H_2$ and at the cathode side $O_2$ is blown in, using an electrolyser. Then the VI curve of this fuel cell is measured.

Further variants, deviating from the specific designs described above, are possible within the protective measures of the following conclusions. For example, both electrode compartments of an electrochemical cell can be made according to the invention. Moreover, depending on the practical design, if the above mentioned specific oxidator is for example oxygen, another oxidator can always be used, for example air or chloride or chloride dioxide, depending on the type of catalyst or other used substances in the system. This analogously applies to the reductor/fuel that can be used in the system.

The invention claimed is:

1. An electrode compartment for an electrochemical cell, the compartment comprising a bicontinuous micro-emulsion, wherein catalytic parts are generated in-situ in a precipitation reaction in said bicontinuous micro-emulsion.

2. The electrode compartment according to claim 1, as a cathode compartment.

3. The electrode compartment according to claim 1, further comprising a supply system to supply oxygen to the compartment.

4. The electrode compartment according to claim 1, further comprising a refreshing system, wherein the refreshing system comprises (a) a reserve container for an emulsion, (b) a storage container for used emulsion, (c) conduits to connect each of the containers with the electrode compartment and (d) a transport unit to move the emulsion.

5. The electrode compartment according to claim 4, wherein the transport unit comprises a pump.

6. The electrode compartment according to claim 4, further comprising a supplying means to supply at least one of an oxidator, a reductor and a fluid.

7. An electrochemical cell, comprising an electrode compartment comprising a bicontinuous micro-emulsion, wherein catalytic parts are generated in-situ in a precipitation reaction in said bicontinuous micro-emulsion.

8. The cell according to claim 7, wherein said electrode compartment is a cathode compartment.

9. The cell according to claim 7, wherein the electrode compartment includes a supply system to supply oxygen to the compartment.

10. The cell according to claim 7, wherein the electrode compartment is part of a refreshing system with a reserve container for an emulsion and a storage container for used emulsion, conduits to connect each of the containers with the electrode compartment and a transport unit, for example a pump, to move the emulsion.

11. The cell according to claim 10, wherein the refreshing system also comprises supplying means to supply at least one of an oxidator, a reductor and a fluid.

12. The cell according to claim 7, wherein said bicontinuous micro-emulsion includes a hydrophilic phase, a hydrophobic phase and a surface-active substance; as well as a catalyst in at least one of the hydrophilic phase and hydrophobic phase, which catalyst has been generated in situ in a precipitation reaction by reduction of a metal complex.

13. The cell according to claim 12, wherein said bicontinuous micro-emulsion is obtainable by mixing (i) a first bicontinuous micro-emulsion comprising a hydrophilic phase, a hydrophobic phase and a surface-active agent, to which bicontinuous micro-emulsion a salt or a metal complex of a catalyst material is supplied to the hydrophilic phase, and a (ii) second bicontinuous micro-emulsion comprising a hydrophilic phase, a hydrophobic phase and a surface-active agent, further containing a reducing material, wherein upon mixing a precipitation reaction takes place on which the catalyst is formed.

* * * * *